(12) United States Patent
Nakamura et al.

(10) Patent No.: US 9,074,063 B2
(45) Date of Patent: Jul. 7, 2015

(54) RUBBER COMPOSITION AND PNEUMATIC TIRE

(71) Applicant: SUMITOMO RUBBER INDUSTRIES, LTD., Kobe-shi (JP)

(72) Inventors: Masanobu Nakamura, Kobe (JP); Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/073,931

(22) Filed: Nov. 7, 2013

(65) Prior Publication Data
US 2014/0128532 A1    May 8, 2014

(30) Foreign Application Priority Data

| Nov. 8, 2012 | (JP) | 2012-246385 |
| Nov. 8, 2012 | (JP) | 2012-246386 |
| Nov. 8, 2012 | (JP) | 2012-246391 |
| Nov. 8, 2012 | (JP) | 2012-246393 |

(51) Int. Cl.
| C08K 3/04 | (2006.01) |
| C08L 9/06 | (2006.01) |
| B60C 1/00 | (2006.01) |
| C08K 5/20 | (2006.01) |
| C08K 13/02 | (2006.01) |
| C08K 3/06 | (2006.01) |
| C08K 3/28 | (2006.01) |

(52) U.S. Cl.
CPC ... *C08K 3/04* (2013.01); *C08L 9/06* (2013.01); *B60C 1/00* (2013.01); *C08K 3/06* (2013.01); *C08K 3/28* (2013.01); *C08K 5/20* (2013.01); *C08K 13/02* (2013.01); *Y02T 10/862* (2013.01)

(58) Field of Classification Search
CPC ............ C08K 3/04; C08K 5/20; C08K 13/02; C08L 9/06; C08L 7/00; B60C 1/00
USPC .............. 524/495, 496, 575.5, 526, 572, 284, 524/396, 398, 166; 152/451, 537, 541, 450
See application file for complete search history.

(56) References Cited

U.S. PATENT DOCUMENTS

| 4,820,751 | A | 4/1989 | Takeshita et al. |
| 5,173,135 | A | 12/1992 | Tokieda et al. |
| 8,440,757 | B2 | 5/2013 | Kushida |
| 2006/0247342 | A1 | 11/2006 | Da Silva et al. |
| 2010/0256258 | A1 | 10/2010 | Miyazaki |
| 2010/0294407 | A1 | 11/2010 | Kushida |
| 2014/0020808 | A1 | 1/2014 | Watanabe et al. |

FOREIGN PATENT DOCUMENTS

| EP | 0 080 451 A1 | 6/1983 |
| EP | 0 814 113 A2 | 12/1997 |
| EP | 0 814 113 A3 | 12/1997 |
| EP | 1 568 735 A1 | 8/2005 |
| EP | 1 726 615 A1 | 11/2006 |
| EP | 2 165 855 A1 | 3/2010 |
| JP | 64-020246 A | 1/1989 |
| JP | 02-202936 A | 8/1990 |
| JP | 2912845 | 4/1999 |
| JP | 2912845 B2 | 6/1999 |
| JP | 2001-114939 | 4/2001 |
| JP | 2002-284927 A | 10/2002 |
| JP | 2005-271857 A | 10/2005 |
| JP | 2006-273934 A | 10/2006 |
| JP | 2006-328194 | 12/2006 |
| JP | 2007-197677 A | 8/2007 |
| JP | 2008-031427 A | 2/2008 |
| JP | 2008-156418 A | 7/2008 |

(Continued)

OTHER PUBLICATIONS

Yosuke Watanabe, et al., "Manufacture of rubber compositions for high fuel efficiency tires" Synthetic Elastomers and Natural Rubber, XP002718376, Nov. 2, 2012, 5 Pages.

(Continued)

*Primary Examiner* — Michael M Bernshteyn

(74) *Attorney, Agent, or Firm* — Oblon, McClelland, Maier & Neustadt, L.L.P.

(57) ABSTRACT

The present invention provides a rubber composition capable of improving the rubber strength and fuel economy in a balanced manner, and a pneumatic tire formed from the rubber composition. The present invention relates to a rubber composition including a rubber component, carbon black, and a compound represented by formula (I) below, wherein the amount of the carbon black is 10 to 100 parts by mass per 100 parts by mass of the rubber component:

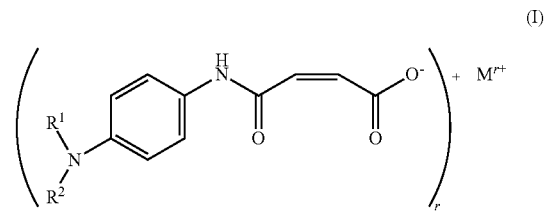

wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

20 Claims, No Drawings

(56) References Cited

FOREIGN PATENT DOCUMENTS

| | | |
|---|---|---|
| JP | 2009-155394 A | 7/2009 |
| JP | 2010-184537 A | 8/2010 |
| JP | 2010-188955 A | 9/2010 |
| JP | 2011-252116 | 12/2011 |
| JP | 2012-87253 A | 5/2012 |
| JP | 2012-122015 A | 6/2012 |
| JP | 2012-180386 A | 9/2012 |
| JP | 2014-084312 A | 5/2014 |
| WO | WO 2009/072560 A1 | 6/2009 |
| WO | WO 2012/147984 A1 | 11/2012 |
| WO | WO 2012147984 A1 * | 11/2012 |

OTHER PUBLICATIONS

"Rubber Composition for Base Tread and Pneumatic Tire" WPI / Thomson Scientific, XP002718377, 2004, 2 Pages.

Geum Ju Jung, "Sidewall rubber composition and tire manufactured by using the same" Hankook Tire Co., Ltd., XP002718505, Jun. 2012, pp. 1-2.

* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

Recently, an increasing desire for better fuel economy of vehicles demands tire rubber compositions excellent in fuel economy. Reducing the hysteresis loss of a rubber composition is generally effective in improving the fuel economy.

Tire rubber compositions generally contain carbon black as a filler because it provides a good reinforcing effect and favorable abrasion resistance. In order to improve the fuel economy in a carbon black formulation, using carbon black having a large particle size or reducing the amount of carbon black may be considered. In such cases, however, the rubber strength, abrasion resistance, wet grip performance, and the like are reduced. Thus, there still remains room for improvement.

The use of silica instead of carbon black is known to improve the fuel economy. However, since silica provides lower reinforcement than carbon black, the rubber strength and the like are reduced in such a case. Thus, there still remains room for improvement.

As the method for improving the fuel economy, Patent Literature 1 discloses the addition of a specific polar group into a rubber in a silica formulation to enhance the dispersibility of silica. In recent years, however, further improvement of the fuel economy has been demanded. In addition, the method still leaves room for improvement in that the rubber strength is lower compared with carbon black formulations.

As another method for improving the fuel economy, Patent Literature 2 discloses the addition of an amine compound to enhance the dispersibility of carbon black. This method still leaves room for improvement in improving the fuel economy, rubber strength, abrasion resistance, and processability in a balanced manner.

Another known method for improving the fuel economy is to form a tread portion having a two-layer structure including a base tread and a cap tread and use a rubber composition excellent in fuel economy in the base tread. Patent Literature 3 discloses a method for improving the fuel economy and handling stability by using a tin-modified butadiene rubber and paper fibers. The method still leaves room for improvement in improving the fuel economy, handling stability, and processability in a balanced manner.

Meanwhile, recently, rubber compositions for fiber cord toppings are increasingly required to provide improvement in fuel economy, handling stability including braking performance during running at high speeds, and riding comfort. A known method for improving the handling stability is to add a phenolic resin to a rubber composition for a fiber cord topping to improve the complex modulus of elasticity (E*), thereby enhancing the rigidity. This method, however, increases tan δ and deteriorates the fuel economy. Thus, there still remains room for improvement.

A known method for improving E* and reducing tan δ is to crosslink a cross-linkable resin such as a resorcinol condensate or modified resorcinol condensate with a methylene donor such as a partial condensate of hexamethylol melamine pentamethyl ether (HMMPME) or a partial condensate of hexamethoxymethylolmelamine (HMMM). Patent Literature 4 discloses a rubber composition having better adhesion to carcass cords and suppressing crack growth, heat build-up and a reduction in rubber properties. In recent years, however, further improvement of the fuel economy has been demanded.

CITATION LIST

Patent Literature

Patent Literature 1: JP-A 2001-114939
Patent Literature 2: Japanese Patent No. 2912845
Patent Literature 3: JP-A 2011-252116
Patent Literature 4: JP-A 2006-328194

SUMMARY OF INVENTION

Technical Problem

The present invention aims to solve the problems mentioned above and provide: a rubber composition with which the rubber strength and fuel economy are improved in a balanced manner; especially a rubber composition with which the fuel economy, rubber strength, abrasion resistance, and processability are improved in a balanced manner, a rubber composition with which the fuel economy, handling stability, and processability are improved in a balanced manner, and a rubber composition with which the processability, rubber strength, flex crack growth resistance, and adhesion to cords are improved in a balanced manner; and a pneumatic tire formed from any of these rubber compositions.

Solution to Problem

The present invention relates to a rubber composition, containing a rubber component, carbon black, and a compound represented by formula (I) below, wherein an amount of the carbon black is 10 to 100 parts by mass per 100 parts by mass of the rubber component:

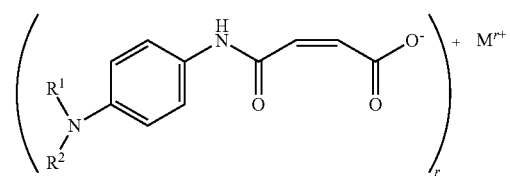

(I)

wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

The compound represented by the formula (I) is preferably represented by the following formula (I-1), (I-2), or (I-3):

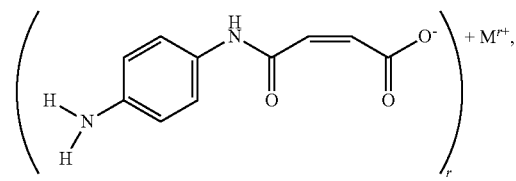

(I-1)

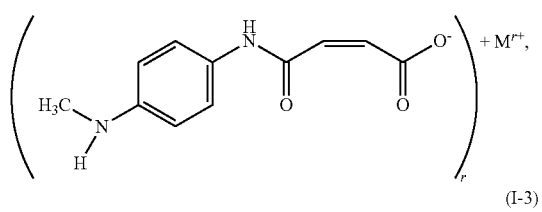

(I-2)

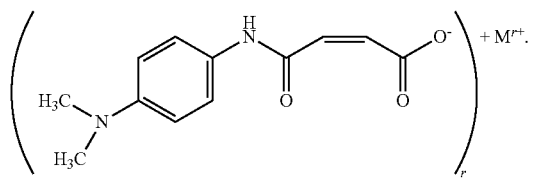

(I-3)

The metal ion is preferably a sodium, potassium, or lithium ion.

An amount of the compound represented by the formula (I) is preferably 0.5 to 20 parts by mass per 100 parts by mass of the carbon black.

The carbon black preferably has a pH of at most 7.9 and a volatile content of at least 0.8% by mass.

The carbon black preferably has a nitrogen adsorption specific surface area of 20 to 330 m$^2$/g and a dibutyl phthalate oil absorption of 40 to 200 cm$^3$/100 g.

Preferably, a combined amount of natural rubber and isoprene rubber is 60 to 80% by mass and an amount of butadiene rubber is 20 to 40% by mass, each based on 100% by mass of the rubber component; the carbon black has a nitrogen adsorption specific surface area of 70 to 200 m$^2$/g and a dibutyl phthalate oil absorption of 75 to 130 cm$^3$/100 g; and the amount of the carbon black is 40 to 60 parts by mass per 100 parts by mass of the rubber component.

Preferably, an amount of a tin-modified butadiene rubber is 5 to 50% by mass based on 100% by mass of the rubber component, the tin-modified butadiene rubber being prepared by polymerization using a lithium initiator and having a tin-atom content of 50 to 3000 ppm, a vinyl bond content of 5 to 50% by mass, and a molecular weight distribution of at most 2; and the amount of the carbon black is 15 to 50 parts by mass per 100 parts by mass of the rubber component.

Preferably, the rubber composition contains: sulfur; at least one cross-linkable resin selected from the group consisting of cresol resins, resorcinol resins, and modified resorcinol resins; and at least one methylene donor selected from the group consisting of partial condensates of hexamethoxymethylolmelamine and partial condensates of hexamethylol melamine pentamethyl ether; the rubber component is a rubber component containing at least one diene rubber selected from the group consisting of isoprene-based rubbers, butadiene rubber, and styrene butadiene rubber; the carbon black has a nitrogen adsorption specific surface area of 20 to 130 m$^2$/g; the amount of the carbon black is 10 to 60 parts by mass, an amount of the sulfur is 2 to 3.5 parts by mass, an amount of the cross-linkable resin is 0.5 to 10 parts by mass, and an amount of the methylene donor is 0.1 to 3 parts by mass, each per 100 parts by mass of the rubber component; and an amount of the compound represented by the formula (I) is 0.5 to 20 parts by mass per 100 parts by mass of the carbon black.

The present invention also relates to a pneumatic tire, formed from the rubber composition.

Advantageous Effects of Invention

Since the rubber composition of the present invention contains a rubber component, carbon black, and a compound represented by the formula (I), a pneumatic tire in which the fuel economy and rubber strength are improved in a balanced manner can be provided.

In a first preferred embodiment of the present invention, the rubber composition contains a specific rubber component, a specific carbon black, and a compound represented by the formula (I), and therefore can provide a pneumatic tire in which the fuel economy, rubber strength, abrasion resistance, and processability are improved in a balanced manner.

In a second preferred embodiment of the present invention, the rubber composition contains a specific tin-modified polybutadiene rubber, carbon black, and a compound represented by the formula (I), and therefore can provide a pneumatic tire in which the fuel economy, handling stability, and processability are improved in a balanced manner.

In a third preferred embodiment of the present invention, the rubber composition contains a specific rubber component, a specific carbon black, a composition represented by the formula (I), sulfur, a specific cross-linkable resin, and a specific methylene donor each in a predetermined amount, and therefore can provide a pneumatic tire in which the processability, rubber strength, flex crack growth resistance, adhesion to cords, and fuel economy are improved in a balanced manner.

DESCRIPTION OF EMBODIMENTS

The rubber composition of the present invention contains a rubber component, carbon black, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I) and therefore heat build-up can be suppressed. These effects improve the fuel economy while maintaining the excellent rubber strength of the carbon black formulation. As a result, these properties can be achieved at high levels in a balanced manner.

Examples of the rubber component include diene rubbers such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). The rubbers may be used alone, or two or more rubbers may be used in combination. In particular, isoprene-based rubbers such as NR and IR, more preferably NR, are preferred because then the compound represented by the formula (I) is more effective in improving the fuel economy. Isoprene-based rubbers (especially NR) have a larger molecular weight than those of synthetic rubbers such as BR, and have their polymer chains cleaved during kneading to generate radicals. The compound represented by the formula (I) captures the generated radicals, so that the polymer chains and the compound represented by the formula (I) are efficiently bound to each other.

The NR is not particularly limited, and NRs commonly used in the tire industry, such as SIR20, RSS #3, and TSR20, may be used. Moreover, also usable are epoxidized natural rubber (ENR), deproteinized natural rubber (DPNR) and highly purified natural rubber (HPNR).

The amount of the isoprene-based rubber based on 100% by mass of the rubber component is preferably at least 40% by mass, and more preferably at least 50% by mass. If the amount is less than 40% by mass, the fuel economy may not be sufficiently improved.

The rubber composition of the present invention contains carbon black. The carbon black is not particularly limited, and carbon blacks commonly used in the tire industry, such as GPF, FEF, HAF, ISAF, and SAF, may be used.

The carbon black preferably has a pH of at most 7.9, more preferably at most 7.8, still more preferably at most 7.7, and particularly preferably at most 7.6. If the pH is higher than 7.9, such carbon black may contain only a small amount of acidic functional groups. Thus, the mutual effect between the carbon black and the compound represented by the formula (I) may become small, failing to achieve sufficient improvement in fuel economy and the like. The lower limit of the pH of carbon black is not particularly limited.

The carbon black preferably has a volatile content of at least 0.8% by mass, more preferably at least 0.9% by mass, and still more preferably at least 1.0% by mass. If the volatile content is less than 0.8% by mass, the mutual effect between the carbon black and the compound represented by the formula (I) may become small, failing to achieve sufficient improvement in fuel economy and the like. The upper limit of the volatile content of carbon black is not particularly limited.

The carbon black preferably has a nitrogen adsorption specific surface area ($N_2SA$) of at least 20 $m^2/g$. If the $N_2SA$ is less than 20 $m^2/g$, sufficient rubber strength may not be secured. The carbon black preferably has an $N_2SA$ of at most 330 $m^2/g$, more preferably at most 300 $m^2/g$, still more preferably at most 250 $m^2/g$, and particularly preferably at most 200 $m^2/g$. If the $N_2SA$ is more than 330 $m^2/g$, sufficient dispersibility of carbon black may not be secured.

The carbon black preferably has a dibutyl phthalate (DBP) oil absorption of at least 40 $cm^3/100$ g. If the DBP oil absorption is less than 40 $cm^3/100$ g, sufficient rubber strength may not be secured. The carbon black preferably has a DBP oil absorption of at most 200 $cm^3/100$ g, more preferably at most 180 $cm^3/100$ g. If the DBP oil absorption is more than 200 $cm^3/100$ g, the minimum elongation at break required may not be secured.

Here, the DBP oil absorption, pH, and volatile content of carbon black are measured by methods in conformity with JIS K6221 (1982), and the $N_2SA$ of carbon black is measured by a method in conformity with JIS K6217 (2001).

The amount of carbon black per 100 parts by mass of the rubber component is at least 10 parts by mass. If the amount is less than 10 parts by mass, sufficient rubber strength may not be secured. The amount of carbon black is at most 100 parts by mass, preferably at most 90 parts by mass, and still more preferably at most 80 parts by mass. If the amount is more than 100 parts by mass, the rubber composition may become so hard that the rubber strength can end up being reduced. In addition, the fuel economy and processability may be deteriorated.

The rubber composition of the present invention contains a compound represented by the following formula (I):

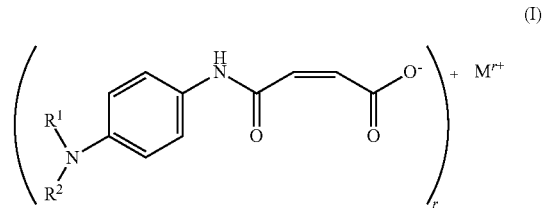

wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

Examples of the alkyl groups represented as $R^1$ and $R^2$ include methyl, ethyl, n-propyl, isopropyl, n-butyl, sec-butyl, and tert-butyl groups.

Examples of the alkenyl groups represented as $R^1$ and $R^2$ include vinyl, allyl, 1-propenyl, and 1-methylethenyl groups.

Examples of the alkynyl groups represented as $R^1$ and $R^2$ include ethynyl and propargyl groups.

$R^1$ and $R^2$ are each preferably a hydrogen atom or an alkyl group, more preferably a hydrogen atom or a methyl group, and still more preferably a hydrogen atom. In other words, the compound represented by the formula (I) is preferably a compound represented by the following formula (I-1), (I-2), or (I-3), and is more preferably a compound represented by the formula (I-1):

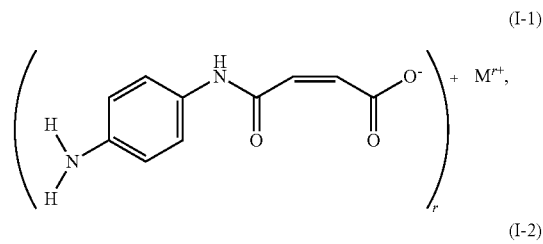

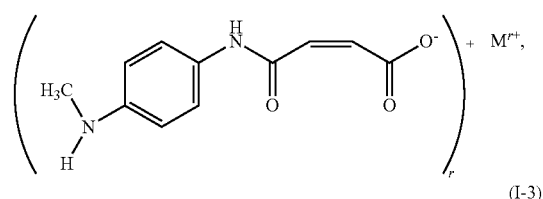

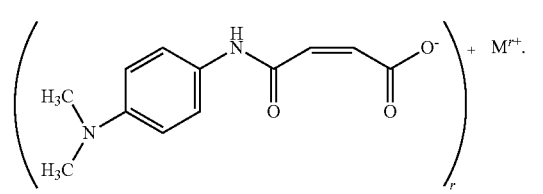

In the formulae (I), (I-1), (I-2), and (I-3), the metal ion may be a sodium, potassium, or lithium ion, and is preferably a sodium ion.

The amount of the compound represented by the formula (I) per 100 parts by mass of carbon black is preferably at least 0.5 parts by mass. If the amount is less than 0.5 parts by mass, the fuel economy may not be sufficiently improved. The amount of the compound represented by the formula (I) is preferably at most 20 parts by mass. If the amount is more than 20 parts by mass, sufficient rubber strength may not be secured.

The rubber composition of the present invention may appropriately contain, in addition to the above-mentioned components, compounding agents commonly used in production of rubber compositions, such as reinforcing fillers (e.g., clay), silane coupling agents, zinc oxide, stearic acid, processing aids, antioxidants, softeners, waxes, vulcanization accelerators, and sulfur.

Examples of the vulcanization accelerators include sulfenamide, thiazole, thiuram, thiourea, guanidine, dithiocarbamate, aldehyde-amine, aldehyde-ammonium, imidazoline, and xanthate vulcanization accelerators. In particular, sulfenamide vulcanization accelerators are preferred. Examples of the sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

The rubber composition of the present invention may be prepared by any known method, such as a method in which the components are kneaded using a known mixer such as a roll mill or a Banbury mixer.

The rubber composition of the present invention can be suitably used for tire components such as treads, base treads, and fiber cord topping rubbers (topping rubbers).

The pneumatic tire of the present invention can be formed from the rubber composition by an ordinary method. Specifically, an unvulcanized rubber composition appropriately containing various additives is extruded into the shape of a tire component such as a tread, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the present invention can be suitably used as a tire for passenger vehicles, trucks, buses, and bikes.

Particularly preferred embodiments are described in the following.

First Preferred Embodiment

The rubber composition according to a first preferred embodiment of the present invention contains a specific rubber component, a specific carbon black, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I) and therefore heat build-up can be suppressed. The use of the compound represented by the formula (I), which provides these effects, in combination with a specific rubber component and a specific carbon black improves the fuel economy while maintaining the excellent rubber strength, abrasion resistance and processability of the carbon black formulation. Therefore, these properties can be achieved at high levels in a balanced manner.

The rubber component of the rubber composition of the present invention contains natural rubber (NR) and/or isoprene rubber (IR), together with butadiene rubber (BR). NR and IR have a larger molecular weight than those of synthetic rubbers such as BR, and have their polymer chains cleaved during kneading to generate radicals. The compound represented by the formula (I) captures these generated radicals, so that the polymer chains and the compound represented by the formula (I) are efficiently bound to each other. In addition, the use of BR secures excellent abrasion resistance. Therefore, the use of NR and/or IR in combination with BR each in a predetermined amount, together with the carbon black and the compound represented by the formula (I), improves the fuel economy, rubber strength, abrasion resistance, and processability at high levels in a balanced manner.

The NR is not particularly limited, and NRs commonly used in the tire industry, such as SIR20, RSS #3, and TSR20, may be used. Similarly, the IR is not particularly limited, and IRs commonly used in the tire industry may be used.

The combined amount of NR and IR based on 100% by mass of the rubber component is preferably at least 60% by mass, more preferably at least 65% by mass, and still more preferably at least 70% by mass. If the combined amount is less than 60% by mass, the fuel economy may not be sufficiently improved. The combined amount of NR and IR is preferably at most 80% by mass. If the combined amount is more than 80% by mass, the amount of BR is so small that sufficient abrasion resistance may not be secured. As a result, the fuel economy, rubber strength, abrasion resistance, and processability may not be achieved in a balanced manner.

The BR is not particularly limited, and BRs commonly used in the tire industry may be used. The BR preferably has a cis content of at least 95 mol % because then the abrasion resistance can be highly improved.

The amount of BR based on 100% by mass of the rubber component is preferably at least 20% by mass. If the amount is less than 20% by mass, sufficient abrasion resistance may not be secured, and therefore the fuel economy, rubber strength, abrasion resistance, and processability may not be achieved in a balanced manner. The amount of BR is preferably at most 40% by mass, more preferably at most 35% by mass, and still more preferably at most 30% by mass. If the amount is more than 40% by mass, the combined amount of NR and IR is so small that sufficient rubber strength may not be achieved.

The rubber composition of the present invention may contain, in addition to NR, IR, and BR, other rubbers as the rubber component. Examples of other rubbers include diene rubbers such as styrene butadiene rubber (SBR), styrene isoprene butadiene rubber (SIBR), ethylene propylene diene rubber (EPDM), chloroprene rubber (CR), and acrylonitrile butadiene rubber (NBR).

The rubber composition of the present invention contains a carbon black having a predetermined nitrogen adsorption specific surface area and a predetermined dibutyl phthalate oil absorption.

The carbon black preferably has a nitrogen adsorption specific surface area ($N_2SA$) of at least 70 $m^2/g$, more preferably at least 100 $m^2/g$. If the $N_2SA$ is less than 70 $m^2/g$, sufficient rubber strength may not be secured. The carbon black preferably has an $N_2SA$ of at most 200 $m^2/g$, more preferably at most 160 $m^2/g$. If the $N_2SA$ is more than 200 $m^2/g$, sufficient dispersibility of carbon black may not be secured.

The carbon black preferably has a dibutyl phthalate (DBP) oil absorption of at least 75 $cm^3/100$ g, more preferably at least 100 $cm^3/100$ g. If the DBP oil absorption is less than 75 $cm^3/100$ g, sufficient rubber strength may not be secured. The carbon black preferably has a DBP oil absorption of at most 130 cm³/100 g. If the DBP oil absorption is more than 130 cm³/100 g, the minimum elongation at break required may not be secured.

The amount of the carbon black per 100 parts by mass of the rubber component is preferably at least 40 parts by mass, and more preferably at least 45 parts by mass. If the amount is less than 40 parts by mass, sufficient rubber strength and abrasion resistance may not be secured. The amount of the carbon black is preferably at most 60 parts by mass, and more preferably at most 55 parts by mass. If the amount is more than 60 parts by mass, the rubber composition may become so hard that the rubber strength and abrasion resistance may end up being reduced. In addition, the fuel economy and processability may also be deteriorated.

The rubber composition of the present invention contains a compound represented by the formula (I). The amount of the compound represented by the formula (I) per 100 parts by mass of carbon black is preferably at least 0.5 parts by mass, more preferably at least 2 parts by mass, and still more preferably at least 4 parts by mass. If the amount is less than 0.5 parts by mass, the fuel economy may not be sufficiently improved. The amount of the compound represented by the formula (I) is preferably at most 15 parts by mass, more preferably at most 10 parts by mass, and still more preferably at most 5 parts by mass. If the amount is more than 15 parts by mass, sufficient rubber strength may not be secured.

The rubber composition of the present invention may appropriately contain, in addition to the above-mentioned components, compounding agents commonly used in production of rubber compositions, such as reinforcing fillers (e.g. clay), silane coupling agents, zinc oxide, stearic acid, processing aids, antioxidants, softeners, waxes, vulcanization accelerators, and sulfur.

The rubber composition of the present invention can be suitably used for treads.

The pneumatic tire of the present invention can be formed from the rubber composition by a conventional method. Specifically, an unvulcanized rubber composition appropriately containing various additives is extruded into the shape of a tire component such as a tread, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the present invention can be suitably used as a tire for passenger vehicles.

Second Preferred Embodiment

The rubber composition according to a second preferred embodiment of the present invention contains a specific tin-modified polybutadiene rubber, carbon black, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I) and therefore heat build-up can be suppressed. The use of the compound represented by the formula (I), which provides these effects, in combination with a specific tin-modified butadiene rubber and carbon black improves the fuel economy while maintaining good processability and handling stability. Therefore, these properties can be achieved at high levels in a balanced manner.

The rubber component of the rubber composition of the present invention contains a tin-modified BR polymerized using a lithium initiator. The tin-modified BR to be used may be obtained by polymerizing 1,3-butadiene using a lithium initiator and then adding a tin compound thereto. A terminal carbon of the tin-modified BR molecule is preferably bound to tin.

Examples of the lithium initiator include lithium compounds such as alkyllithium, aryllithium, allyllithium, vinyllithium, organic tin lithium, or organic nitrogen lithium compounds. The use of the lithium compound facilitates the production of a tin-modified BR with a high vinyl bond content and a low cis bond content.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. These may be used alone, or two or more of these may be used in combination.

The tin-modified BR preferably has a tin-atom content of at least 50 ppm, more preferably at least 60 ppm, and still more preferably at least 100 ppm. If the tin-atom content is less than 50 ppm, the effect of improving the dispersibility of filler tends to be reduced, leading to poor fuel economy. The tin-atom content in the tin-modified BR is preferably at most 3000 ppm, more preferably at most 2500 ppm, still more preferably at most 1500 ppm, and particularly preferably at most 500 ppm. If the tin-atom content is more than 3000 ppm, the kneaded mixture tends not to easily come together and the edges thereof tend to become rough. Thus, the kneaded mixture tends to have poor extrusion processability.

The tin-modified BR preferably has a vinyl bond content of at least 5% by mass, more preferably at least 7% by mass. If the vinyl bond content is less than 5% by mass, the polymerization (production) of the tin-modified BR tends to be hard. The vinyl bond content of the tin-modified BR is preferably at most 50% by mass, and more preferably at most 20% by mass. If the vinyl bond content is more than 50% by mass, the dispersibility of filler tends to be deteriorated and the tensile strength of the rubber composition tends to be lowered.

Here, the vinyl bond content (1,2-butadiene unit content) can be measured by infrared absorption spectrometry.

The tin-modified BR preferably has a molecular weight distribution (Mw/Mn) of at most 2, more preferably at most 1.8, and still more preferably at most 1.5. If the Mw/Mn is more than 2, the dispersibility of filler and therefore the fuel economy tend to be deteriorated.

Here, the number average molecular weight (Mn) and weight average molecular weight (Mw) are determined by a gel permeation chromatograph (GPC) (GPC-8000 series produced by Tosoh Corporation, detector: differential refractometer, column: TSKGEL SUPERMULTIPORE HZ-M produced by Tosoh Corporation) and calibrated with polystyrene standards.

The amount of the tin-modified BR based on 100% by mass of the rubber component is preferably at least 5% by mass, more preferably at least 20% by mass, and still more preferably at least 25% by mass. If the amount is less than 5% by mass, the fuel economy may not be sufficiently improved. The amount of the tin-modified BR is preferably at most 50% by mass, more preferably at most 40% by mass, and still more preferably at most 30% by mass. If the amount is more than 50% by mass, the improvement owing to the compound represented by the formula (I) may not be sufficiently achieved.

The rubber component of the rubber composition of the present invention may contain, together with the tin-modified BR, other rubbers. Examples of other rubbers include diene rubbers such as natural rubber (NR), isoprene rubber (IR), butadiene rubber (BR), styrene butadiene rubber (SBR), chloroprene rubber (CR), styrene isoprene butadiene rubber (SIBR), styrene isoprene rubber (SIR), and isoprene butadiene rubber. In particular, NR and BR are preferred, and NR is more preferred, because then the fuel economy, handling stability, and processability are improved in a balanced manner. NR has a larger molecular weight than those of synthetic rubbers such as BR, and has its polymer chains cleaved during kneading to generate radicals. The compound represented by the formula (I) captures these generated radicals, so that the polymer chains and the compound represented by the formula (I) are efficiently bound to each other.

The NR is not particularly limited, and NRs commonly used in the tire industry, such as SIR20, RSS #3, and TSR20, may be used. Also usable are epoxidized natural rubber (ENR), deproteinized natural rubber (DPNR) and highly purified natural rubber (HPNR).

The amount of NR based on 100% by mass of the rubber component is preferably at least 50% by mass, more preferably at least 60% by mass, and still more preferably at least 70% by mass. If the amount is less than 50% by mass, the fuel economy may not be sufficiently improved. The amount of NR is preferably at most 95% by mass, more preferably at most 80% by mass, and still more preferably at most 75% by mass. If the amount is more than 95% by mass, the amount of the tin-modified BR becomes too small, possibly failing to achieve fuel economy, handling stability, and processability in a balanced manner.

The rubber composition of the present invention contains carbon black. The carbon black is not particularly limited, and carbon blacks commonly used in the tire industry, such as GPF, FEF, HAF, ISAF, and SAF, may be used.

The carbon black preferably has a nitrogen adsorption specific surface area ($N_2SA$) of at least 50 $m^2/g$, more preferably at least 55 $m^2/g$, still more preferably at least 58 $m^2/g$, and particularly preferably at least 62 $m^2/g$. If the $N_2SA$ is less than 50 $m^2/g$, sufficient handling stability may not be secured. The carbon black preferably has an $N_2SA$ of at most 125 $m^2/g$, more preferably at most 115 $m^2/g$, still more preferably at most 100 $m^2/g$, and particularly preferably at most 90 $m^2/g$. If the $N_2SA$ is more than 125 $m^2/g$, the processability and fuel economy may be deteriorated.

The carbon black preferably has a dibutyl phthalate (DBP) oil absorption of at least 70 $cm^3/100$ g, more preferably at least 90 $cm^3/100$ g, and still more preferably at least 103 $cm^3/100$ g. If the DBP oil absorption is less than 70 $cm^3/100$ g, sufficient handling stability may not be secured. The carbon black preferably has a DBP oil absorption of at most 155 $cm^3/100$ g, more preferably at most 150 $cm^3/100$ g. If the DBP oil absorption is more than 155 $cm^3/100$ g, the minimum elongation at break required may not be secured.

The amount of carbon black per 100 parts by mass of the rubber component is preferably at least 15 parts by mass, more preferably at least 30 parts by mass, and still more preferably at least 35 parts by mass. If the amount is less than 15 parts by mass, sufficient handling stability may not be secured. The amount of carbon black is preferably at most 50 parts by mass, and more preferably at most 45 parts by mass. If the amount is more than 50 parts by mass, the fuel economy and processability may be deteriorated.

The rubber composition of the present invention contains a compound represented by the formula (I). The amount of the compound represented by the formula (I) per 100 parts by mass of carbon black is preferably at least 0.5 parts by mass, and more preferably at least 1.5 parts by mass. If the amount is less than 0.5 parts by mass, the fuel economy may not be sufficiently improved. The amount of the compound represented by the formula (I) is preferably at most 20 parts by mass, more preferably at most 19 parts by mass, still more preferably at most 13 parts by mass, and particularly preferably at most 3 parts by mass. If the amount is more than 20 parts by mass, sufficient handling stability may not be secured.

The rubber composition of the present invention may appropriately contain, in addition to the above-mentioned components, compounding agents commonly used in production of rubber compositions, such as reinforcing fillers (e.g., silica), silane coupling agents, zinc oxide, stearic acid, processing aids, antioxidants, oils, waxes, vulcanization accelerators, and sulfur.

The antioxidant to be used may be appropriately selected from amine, phenolic, and imidazole compounds, metal calbamates, waxes and the like. In particular, amine compounds are preferred, and N-(1,3-dimethylbutyl)-N'-phenyl-p-phenylenediamine is more preferred.

The amount of the antioxidant per 100 parts by mass of the rubber component is preferably at least 1 part by mass, and more preferably at least 1.3 parts by mass, whereas it is preferably at most 2 parts by mass, and more preferably at most 1.7 parts by mass. With an amount in that range, the effects of the present invention can be favorably achieved.

Examples of the oil include: process oils such as paraffinic oil, naphthenic oil, and aromatic oil; and vegetable fats and oils such as castor oil, cotton seed oil, and linseed oil. In particular, preferred are process oils, more preferably aromatic oils.

The amount of oil per 100 parts by mass of the rubber component is preferably at least 5 parts by mass, and more preferably at least 6 parts by mass, whereas it is preferably at most 8.5 parts by mass, and more preferably at most 7.5 parts by mass. With an amount in that range, the effects of the present invention can be favorably achieved.

Examples of the vulcanization accelerator include N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazole (MBT), dibenzothiazolyl disulfide (METS), and diphenylguanidine (DPG). These vulcanization accelerators may be used alone, or two or more of these may be used in combination. In particular, sulfenamide vulcanization accelerators such as TBBS and CBS, preferably TBBS, are preferred because they have excellent curing properties and enable the rubber vulcanizates to have excellent fuel economy.

The amount of the vulcanization accelerator per 100 parts by mass of the rubber component is preferably at least 1 part by mass, and more preferably at least 1.3 parts by mass. If the amount is less than 1 part by mass, the rubber composition may not be sufficiently cured, failing to achieve the required rubber properties. The amount of the vulcanization accelerator is preferably at most 2 parts by mass, and more preferably at most 1.7 parts by mass. If the amount is more than 2 parts by mass, compound scorch may be caused.

The rubber composition of the present invention can be suitably used for base treads of tires.

The pneumatic tire of the present invention can be formed from the rubber composition by a conventional method. Specifically, an unvulcanized rubber composition appropriately containing various additives is extruded into the shape of a tire component such as a base tread, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the present invention can be used as a tire for passenger vehicles, trucks, buses, bikes or the like. In particular, the pneumatic tire of the present invention can be suitably used for passenger vehicles and bikes.

Third Preferred Embodiment

The rubber composition according to a third preferred embodiment of the present invention contains a specific rubber component, a specific carbon black, a compound represented by the formula (I), sulfur, a specific cross-likable resin, and a specific methylene donor. The compound represented by the formula (I) binds to carbon black by a reaction of its terminal nitrogen functional group with a functional group, such as carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I) and therefore heat build-up can be suppressed. The addition of the compound represented by the formula (I), which provides these effects, in combination with a specific carbon black, sulfur, a specific cross-linkable resin, and a specific methylene donor to a rubber composition containing a specific rubber component greatly improves the fuel economy while maintaining the processability, rubber strength, flex crack growth resistance, and adhesion to cords of the rubber composition at acceptable levels.

The rubber composition of the present invention contains, as the rubber component, at least one selected from the group consisting of isoprene-based rubbers, butadiene rubber (BR), and styrene butadiene rubber (SBR).

Examples of the isoprene-based rubbers include natural rubber (NR), isoprene rubber (IR), epoxidized natural rubber (ENR), and highly purified natural rubber (HPNR), and NR can be suitably used. Isoprene-based rubbers have their polymer chains cleaved during kneading to generate radicals. The compound represented by the formula (I) captures these generated radicals, so that the polymer chains and the compound represented by the formula (I) are bound to each other. The NR is not particularly limited, and NRs commonly used in the tire industry, such as SIR20, RSS #3, and TSR20, may be used.

The SBR is also not particularly limited, and emulsion-polymerized SBR (E-SBR) or solution-polymerized SBR (S-SBR) can be suitably used.

The BR is also not particularly limited, and BRs commonly used in the tire industry may be used. For example, BR having a high cis content (high cis BR), such as BR130B and BR150B produced by UBE INDUSTRIES, LTD., or modified BR may be suitably used. Examples of preferred modified BRs include tin-modified BR and BR modified by a compound containing a glycidylamino group in the molecule.

The amount of the isoprene-based rubber based on 100% by mass of the rubber component is preferably at least 50% by mass, more preferably at least 60% by mass, and still more preferably at least 70% by mass. If the amount is less than 50% by mass, the fuel economy may not be sufficiently improved. In addition, sufficient rubber strength may not be secured, and therefore the rubber composition may be broken by contact with irregularities or foreign objects on the road surface during running of the tires. The amount may be 100% by mass, and is preferably at most 90% by mass, and more preferably at most 80% by mass.

The amount of SBR based on 100% by mass of the rubber component may be 0% by mass, and is preferably at least 10% by mass, and more preferably at least 15% by mass. If the amount is less than 10% by mass, sufficient adhesion to cords, rubber strength, and flex crack growth resistance may not be secured. The amount is preferably at most 40% by mass, and more preferably at most 35% by mass. If the amount is more than 40% by mass, the fuel economy, adhesion to cords, rubber strength, and flex crack growth resistance may be lowered.

The amount of BR based on 100% by mass of the rubber component may be 0% by mass, and is preferably at least 10% by mass, and more preferably at least 12% by mass. If the amount is less than 10% by mass, the flex crack growth resistance may be lowered. The amount is preferably at most 30% by mass, and more preferably at most 25% by mass. If the amount is more than 30% by mass, the rubber composition is less likely to be wound around a roll during kneading, possibly resulting in lowered processability.

The rubber composition of the present invention contains a carbon black having a predetermined nitrogen adsorption specific surface area. The carbon black has a nitrogen adsorption specific surface area ($N_2SA$) of at least 20 $m^2/g$, preferably at least 25 $m^2/g$, and more preferably at least 30 $m^2/g$. If the $N_2SA$ is less than 20 $m^2/g$, sufficient rubber strength may not be secured. The $N_2SA$ is at most 130 $m^2/g$, preferably at most 120 $m^2/g$, and more preferably at most 100 $m^2/g$. If the $N_2SA$ is more than 130 $m^2/g$, the heat build-up due to carbon black may become greater and the reaction with the compound represented by the formula (I) is less likely to progress, possibly leading to insufficient improvement of the fuel economy.

The carbon black preferably has a dibutyl phthalate (DBP) oil absorption of at least 40 $cm^3/100$ g, more preferably at least 70 $cm^3/100$ g. If the DBP oil absorption is less than 40 $cm^3/100$ g, sufficient rubber strength may not be secured. The DBP oil absorption is preferably at most 180 $cm^3/100$ g, and more preferably at most 160 $cm^3/100$ g. If the DBP oil absorption is more than 180 $cm^3/100$ g, the minimum elongation at break required may not be secured.

The carbon black preferably has a pH of at most 7.9, more preferably at most 7.8, still more preferably at most 7.7, and particularly preferably at most 7.6. If the pH is more than 7.9, the carbon black may have only a small amount of acidic functional groups to have lower reactivity (interaction) with the compound represented by the formula (I). As a result, the fuel economy and the like may not be sufficiently improved. The lower limit of the pH is not particularly limited, and is preferably at least 3.0, and more preferably at least 3.5. If the pH is less than 3.0, the rubber composition has a lower pH, which tends to lead to reduced activity of the vulcanizing agent and therefore reduced crosslinking efficiency.

The carbon black preferably has a volatile content of at least 0.8% by mass, more preferably at least 0.9% by mass, and still more preferably at least 1.0% by mass. If the volatile content is less than 0.8% by mass, the reactivity (interaction) with the compound represented by the formula (I) may become small, possibly failing to improve the fuel economy and the like sufficiently. The upper limit of the volatile content is not particularly limited, and is preferably at most 3.5% by mass, and more preferably at most 3.0% by mass. If the volatile content is more than 3.5% by mass, in the vulcanization step, vulcanization needs to be continued until the volatile components mostly volatilize so that no porosity can be formed. In such a case, the curing time is likely to be prolonged to deteriorate the productivity.

The amount of the carbon black per 100 parts by mass of the rubber component is at least 10 parts by mass, preferably at least 20 parts by mass, and more preferably at least 30 parts by mass. If the amount is less than 10 parts by mass, sufficient flex crack growth resistance may not be secured. The amount is preferably at most 60 parts by mass, and more preferably at most 55 parts by mass. If the amount is more than 60 parts by mass, the rubber composition may become so hard that the flex crack growth resistance may end up being reduced. In addition, the fuel economy may also be deteriorated.

The rubber composition of the present invention contains a compound represented by the formula (I). The amount of the compound represented by the formula (I) per 100 parts by mass of carbon black is preferably at least 0.5 parts by mass, more preferably at least 1 part by mass, and still more preferably at least 2 parts by mass. If the amount is less than 0.5 parts by mass, the fuel economy may not be sufficiently improved. The amount of the compound represented by the formula (I) is preferably at most 20 parts by mass, more preferably at most 15 parts by mass, and still more preferably at most 10 parts by mass. If the amount is more than 20 parts by mass, sufficient flex crack growth resistance may not be secured.

The rubber composition of the present invention contains sulfur. The sulfur is not particularly limited, and sulfurs commonly used in the tire industry may be used. In particular, insoluble sulfur is preferred. The insoluble sulfur refers to sulfur obtained by heating and then quenching natural sulfur $S_8$ so that the sulfur has a high molecular weight ($S_x$ (x=100,000 to 300,000)). The use of insoluble sulfur prevents blooming which is generally caused in the case of using sulfur as a rubber vulcanizing agent.

The amount of sulfur per 100 parts by mass of the rubber component is preferably at least 2 parts by mass, more preferably at least 2.2 parts by mass, and still more preferably at least 2.4 parts by mass. If the amount is less than 2 parts by mass, a sufficient amount of sulfur may not be supplied to a layer adhering to cords, which may lead to reduced adhesion to cords. The amount is preferably at most 3.5 parts by mass, more preferably at most 3.0 parts by mass, and still more preferably at most 2.8 parts by mass. If the amount is more than 3.5 parts by mass, the sulfur crosslink density may be increased, leading to a reduction in flex crack growth resistance, especially after thermo-oxidative degradation.

The rubber composition of the present invention contains at least one cross-linkable resin selected from the group consisting of cresol resins, resorcinol resins (condensates), and modified resorcinol resins (condensates). This improves the adhesion to cords.

The cresol resins are compounds represented by the following formula:

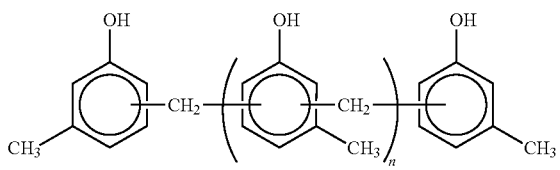

wherein n represents an integer of 1 or more.

The resorcinol resins (condensates) are compounds represented by the following formula:

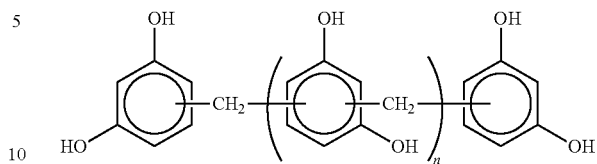

wherein n represents an integer of 1 or more.

The modified resorcinol resins (condensates) are compounds represented by the following formula. In the formula, R represents an alkyl group. Examples of the modified resorcinol resins (condensates) include resorcinol-alkylphenol-formalin copolymers (e.g. SUMIKANOL 620 produced by Taoka Chemical Co., Ltd.) and resorcinol-formalin reaction products (penacolite resins) (e.g. 1319S produced by INDSPEC Chemical Corporation).

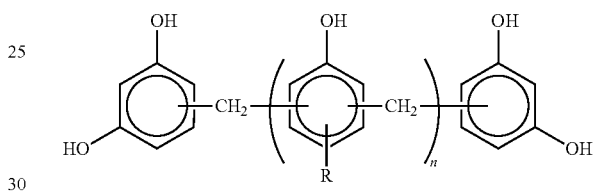

In the formula, n represents an integer of 1 or more, and R represents an alkyl group or a hydroxyl group.

The amount of the cross-linkable resin per 100 parts by mass of the rubber component is preferably at least 0.5 parts by mass, and more preferably at least 1 part by mass. If the amount is less than 0.5 parts by mass, the crosslink density may be small, failing to secure sufficient rubber strength. The amount is preferably at most 10 parts by mass, more preferably at most 5 parts by mass, and still more preferably at most 2 parts by mass. If the amount is more than 10 parts by mass, the heat build-up tends to increase to lower the fuel economy.

The rubber composition of the present invention contains, together with the cross-linkable resin, at least one methylene donor selected from the group consisting of partial condensates of hexamethoxymethylolmelamine and partial condensates of hexamethylol melamine pentamethyl ether.

The partial condensates of hexamethoxymethylolmelamine (HMMM) are compounds represented by the following formula. In the formula, n represents an integer of 1 or more, and is typically 1 to 3.

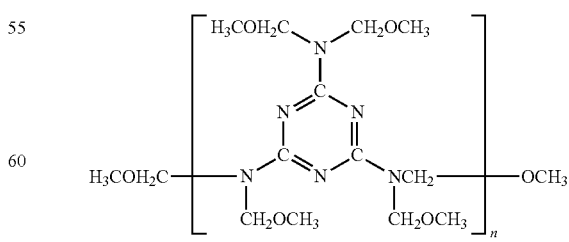

In the formula, n represents an integer of 1 or more.

The partial condensates of hexamethylol melamine pentamethyl ether (HMMPME) are compounds represented by the following formula. In the formula, n represents an integer of 1 or more, and is typically 1 to 3.

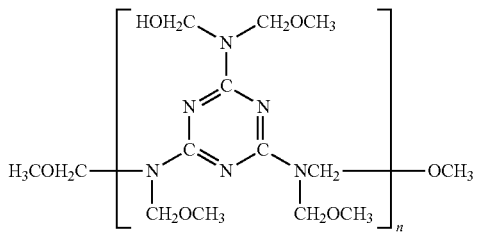

In the formula, n represents an integer of 1 or more.

The amount of the methylene donor per 100 parts by mass of the rubber component is preferably at least 0.1 parts by mass, more preferably at least 0.5 parts by mass, still more preferably at least 0.6 parts by mass, and particularly preferably at least 1 part by mass. If the amount is less than 0.1 parts by mass, sufficient rubber strength may not be secured. The amount is preferably at most 3 parts by mass, and more preferably at most 2.5 parts by mass. If the amount is more than 3 parts by mass, the heat build-up tends to increase to lower the fuel economy.

The rubber composition of the present invention may contain, in addition to the carbon black, other reinforcing fillers. Examples of other reinforcing fillers include silica, calcium carbonate, aluminum hydroxide, clay, talc, and alumina. In particular, silica is preferred.

In the case where the rubber composition of the present invention contains silica, the amount of silica per 100 parts by mass of the rubber component is preferably at least 1 part by mass, and more preferably at least 5 parts by mass, whereas it is preferably at most 20 parts by mass, and more preferably at most 15 parts by mass, because then favorable adhesion to cords and favorable flex crack growth resistance can be obtained.

The total amount of reinforcing fillers per 100 parts by mass of the rubber component is preferably at least 10 parts by mass, and more preferably at least 40 parts by mass. If the total amount is less than 10 parts by mass, sufficient reinforcement may not be achieved. The total amount is preferably at most 70 parts by mass, and more preferably at most 65 parts by mass. If the total amount is more than 70 parts by mass, the hardness tends to become so high that the flex crack growth resistance can be reduced.

The rubber composition of the present invention may appropriately contain, in addition to the above components, compounding agents commonly used in production of rubber compositions, such as silane coupling agents, zinc oxide, antioxidants, oils, waxes, stearic acid, and vulcanization accelerators.

Examples of the antioxidants include amine-ketone, bisphenol, polyphenol, aromatic secondary amine, and thiourea antioxidants. In particular, amine-ketone antioxidants are preferred because then favorable adhesion to cords can be achieved. The amine-ketone antioxidant may suitably be a 2,2,4-trimethyl-1,2-dihydroquinoline polymer.

The rubber composition of the present invention can be suitably used as a rubber composition for a fiber cord topping (rubber composition for topping), and is especially suitable for carcasses or belts including fiber cords.

The fiber cords are prepared from raw materials such as polyester, nylon, rayon, or polyethylene terephthalate. In particular, polyester is preferably used because it is excellent in thermal stability and cost-effective.

The pneumatic tire of the present invention can be formed by covering fiber cords with the rubber composition of the present invention to form a carcass, belts or the like, assembling the resulting component with other tire components to prepare an unvulcanized tire, and then vulcanizing the tire. The use of the rubber composition of the present invention as a rubber composition for a fiber cord topping advantageously improves the fuel economy while maintaining the processability, rubber strength, flex crack growth resistance, and adhesion to cords.

The pneumatic tire of the present invention has processability, rubber strength, flex crack growth resistance, adhesion to cords, and fuel economy which are improved in a balanced manner, and therefore can be suitably used not only as a tire for passenger vehicles but also as a tire for light trucks.

EXAMPLES

The present invention is more specifically described with reference to, but not limited to, examples.

In the following, chemicals used in examples and comparative examples shown in Tables 1 to 4 are listed.
Natural rubber (NR): TSR20
Butadiene rubber (BR): BR01 produced by JSR Corporation
Styrene butadiene rubber (SBR): Nipol 1502 produced by ZEON CORPORATION
Carbon black 1: DIABLACK I ($N_2SA$: 114 $m^2/g$, DBP oil absorption: 114 $cm^3/100$ g, pH: 7.5, volatile content: 1.0% by mass) produced by Mitsubishi Chemical Corporation
Carbon black 2: DIABLACK #4000B ($N_2SA$: 100 $m^2/g$, DBP oil absorption: 102 $cm^3/100$ g, pH: 10.0, volatile content: 0.3% by mass) produced by Mitsubishi Chemical Corporation
Carbon black 3: DIABLACK H($N_2SA$: 79 $m^2/g$, DBP oil absorption: 105 $cm^3/100$ g, pH: 7.5, volatile content: 1.0% by mass) produced by Mitsubishi Chemical Corporation
Carbon black 4: DIABLACK #30 ($N_2SA$: 74 $m^2/g$, DBP oil absorption: 113 $cm^3/100$ g, pH: 8.0, volatile content: 0.6% by mass) produced by Mitsubishi Chemical Corporation
Compound I: (2Z)-4-[(4-aminophenyl)amino]-4-oxo-2-butenoic acid sodium salt (compound represented by the following formula) produced by Sumitomo Chemical Co., Ltd.

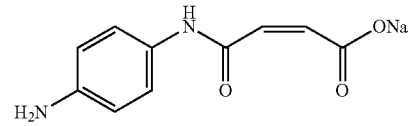

N,N-dimethyl-n-octadecylamine: N,N-dimethyl-n-octadecylamine produced by KANTO CHEMICAL CO., INC.
N-phenylmaleamidic acid sodium salt: synthesized as described below
Zinc oxide: Zinc oxide #1 produced by MITSUI MINING & SMELTING CO., LTD.
Stearic acid: TSUBAKI produced by NOF CORPORATION
Antioxidant: NOCRAC 6C (N-(1,3-dimethylbutyl)-N'-phenyl-p-phenylenediamine) produced by OUCHI SHINKO CHEMICAL INDUSTRIAL CO., LTD.
Sulfur: Powder sulfur produced by TSURUMI CHEMICAL INDUSTRY CO., LTD.
Vulcanization accelerator: NOCCELER-NS (N-tert-butyl-2-benzothiazolylsulfenamide) produced by OUCHI SHINKO CHEMICAL INDUSTRIAL CO., LTD.

<Synthesis of N-Phenylmaleamidic Acid Sodium Salt>

Aniline (1 mol) and maleic anhydride (1.0 mol) were subjected to an addition reaction at 20 to 30° C. for 2.5 hours to give N-phenylmaleamidic acid. Then, the resulting N-phenylmaleamidic acid was neutralized with sodium hydroxide under cooling to give an N-phenylmaleamidic acid sodium salt.

Examples and Comparative Examples

In accordance with each of the formulations shown in Tables 1 to 4, materials except sulfur and a vulcanization accelerator were kneaded using a 1.7-L Banbury mixer produced by KOBE STEEL, LTD. at 150° C. for five minutes to give a kneaded mixture. To the kneaded mixture, the sulfur and vulcanization accelerator were added, and the resulting mixture was kneaded using an open roll mill at 80° C. for five minutes to give an unvulcanized rubber composition. The unvulcanized rubber composition was press-vulcanized in a 2 mm-thick mold at 150° C. for 30 minutes to give a vulcanized rubber composition.

The following evaluation was performed on the thus obtained unvulcanized rubber compositions and vulcanized rubber compositions. Tables 1 to 4 show the results. In the following evaluation, the reference comparative examples in Tables 1, 2, 3, and 4 are Comparative Examples 1, 9, 15, and 16, respectively.

<Mooney Viscosity>

The Mooney viscosity of each unvulcanized rubber composition was measured at 130° C. by a method in conformity with JIS K6300, and the measured value is expressed as an index (Mooney viscosity index) calculated from the following formula. A larger index indicates lower Mooney viscosity and better processability.

(Mooney viscosity index)=($ML_{1+4}$ of reference comparative example)/($ML_{1+4}$ of each formulation)×100

<Scorch Time>

Each unvulcanized rubber composition was vulcanized while being vibrated at 160° C. using a curelastometer. The time t5 (minutes) needed for rise by 5% in torque was measured. The T5 of Comparative Example 1 was regarded as a reference, and the $\Delta$t5 (minutes) of each formulation was calculated. A smaller t5 indicates a shorter scorch time and lower processability.

<Breaking Energy>

The tensile strength and elongation at break of a rubber sheet prepared from each vulcanized composition were measured in conformity with JIS K6251 "Rubber, vulcanized or thermoplastic—Determination of tensile stress-strain properties". The breaking energy of each formulation was calculated from: (tensile strength)×(elongation at break)/2, and is expressed as an index calculated from the following formula. A larger index indicates better rubber strength.

(Breaking energy index)=(Breaking energy of each formulation)/(Breaking energy of reference comparative example)×100

<Fuel Economy (Rolling Resistance)>

The loss tangent (tan δ) of each vulcanized rubber composition was measured using a viscoelastic spectrometer VES (Iwamoto Seisakusho) at a temperature of 50° C., an initial strain of 10%, a dynamic strain of 2%, and a frequency of 10 Hz, and is expressed as an index calculated from the following formula. A larger index indicates smaller rolling resistance and better fuel economy.

(Fuel economy index)=(tan δ of reference comparative example)/(tan δ of each formulation)×100

TABLE 1

| | | Example | | | | | | | Comparative Example | | | | | | | |
|---|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 | 8 |
| Formulation (part(s) by mass) | NR | 100 | 100 | 100 | 100 | 100 | 100 | 100 | 100 | 100 | 100 | 100 | 100 | 100 | 100 | 100 |
| | Carbon black 1 | 50 | 50 | 50 | 50 | 50 | 50 | 50 | 50 | — | 50 | 50 | 50 | 50 | — | — |
| | Carbon black 2 | — | — | — | — | — | — | — | — | 50 | — | — | — | — | 50 | 50 |
| | Compound I | 0.25 | 0.5 | 1 | 2.5 | 5 | 7.5 | 10 | — | — | — | — | 0.15 | 12 | 1 | 5 |
| | N,N-dimethyl-n-octadecylamine | — | — | — | — | — | — | — | — | — | 1 | — | — | — | — | — |
| | N-phenyl-maleamidic acid sodium salt | — | — | — | — | — | — | — | — | — | — | 2.5 | — | — | — | — |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Stearic acid | 2 | 2 | 2 | 2 | 2 | 2 | 2 | 2 | 2 | 2 | 2 | 2 | 2 | 2 | 2 |
| | Antioxidant | 1 | 1 | 1 | 1 | 1 | 1 | 1 | 1 | 1 | 1 | 1 | 1 | 1 | 1 | 1 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Vulcanization accelerator | 1 | 1 | 1 | 1 | 1 | 1 | 1 | 1 | 1 | 1 | 1 | 1 | 1 | 1 | 1 |
| {(Amount of Compound I)/ (amount of carbon black)] × 100 | | 0.5 | 1 | 2 | 5 | 10 | 15 | 20 | — | — | — | — | 0.3 | 24 | 2 | 10 |
| Evaluation | Mooney viscosity index | 99 | 98 | 95 | 95 | 92 | 88 | 85 | 100 | 108 | 98 | 100 | 99 | 80 | 104 | 102 |
| | Scorch time $\Delta$t5 (minutes) | −0.5 | −0.8 | −1.2 | −1.8 | −2.2 | −3.0 | −4.0 | Reference | 2.0 | −12.0 | 0.5 | ±0 | −5.0 | −1.0 | −2.0 |
| | Breaking energy index | 102 | 104 | 106 | 102 | 100 | 98 | 95 | 100 | 100 | 105 | 102 | 100 | 90 | 99 | 98 |
| | Fuel economy index | 108 | 112 | 120 | 124 | 128 | 132 | 135 | 100 | 85 | 105 | 102 | 105 | 136 | 85 | 87 |

TABLE 2

|  |  | Example | | | Comparative Example | | | | | |
|---|---|---|---|---|---|---|---|---|---|---|
|  |  | 8 | 9 | 10 | 9 | 10 | 11 | 12 | 13 | 14 |
| Formulation (part(s) by mass) | NR | 100 | 100 | 100 | 100 | 100 | 100 | 100 | 100 | 100 |
|  | Carbon black 3 | 50 | 50 | 50 | 50 | — | 50 | 50 | — | — |
|  | Carbon black 4 | — | — | — | — | 50 | — | — | 50 | 50 |
|  | Compound I | 1 | 2.5 | 10 | — | — | 0.15 | 12 | 1 | 5 |
|  | Zinc oxide | 2.5 | 2.5 | 2.5 | 2.5 | 2.5 | 2.5 | 2.5 | 2.5 | 2.5 |
|  | Stearic acid | 2 | 2 | 2 | 2 | 2 | 2 | 2 | 2 | 2 |
|  | Antioxidant | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 |
|  | Vulcanization accelerator | 1 | 1 | 1 | 1 | 1 | 1 | 1 | 1 | 1 |
| {(Amount of Compound I)(amount of carbon black)} × 100 |  | 2 | 5 | 20 | — | — | 0.3 | 24 | 5 | 10 |
| Evaluation | Mooney viscosity index | 97 | 95 | 86 | 100 | 106 | 99 | 82 | 105 | 103 |
|  | Scorch time ⊿t5 (minutes) | −1.0 | −2.1 | −4.5 | Reference | 1.5 | −0.5 | −5.2 | −1.8 | −2.2 |
|  | Breaking energy index | 102 | 104 | 97 | 100 | 100 | 101 | 89 | 98 | 99 |
|  | Fuel economy index | 125 | 132 | 140 | 100 | 90 | 105 | 142 | 93 | 96 |

TABLE 3

|  |  | Example 11 | Comparative Example 15 |
|---|---|---|---|
| Formulation (part(s) by mass) | NR | 60 | 60 |
|  | BR | 40 | 40 |
|  | Carbon black 1 | 50 | 50 |
|  | Compound 1 | 2.5 | — |
|  | Zinc oxide | 2.5 | 2.5 |
|  | Stearic acid | 2 | 2 |
|  | Antioxidant | 1 | 1 |
|  | Sulfur | 1.5 | 1.5 |
|  | Vulcanization accelerator | 1 | 1 |
| {(Amount of Compound I)/(amount of carbon black)} × 100 |  | 5 | — |
| Evaluation | Mooney viscosity index | 94 | 100 |
|  | Scorch time ⊿t5 (minutes) | −2.2 | Reference |
|  | Breaking energy index | 102 | 100 |
|  | Fuel economy index | 115 | 100 |

TABLE 4

|  |  | Example 12 | Comparative Example 16 |
|---|---|---|---|
| Formulation (part(s) by mass) | NR | 70 | 70 |
|  | SBR | 30 | 30 |
|  | Carbon black 1 | 50 | 50 |
|  | Compound I | 2.5 | — |
|  | Zinc oxide | 2.5 | 2.5 |
|  | Stearic acid | 2 | 2 |
|  | Antioxidant | 1 | 1 |
|  | Sulfur | 1.5 | 1.5 |
|  | Vulcanization accelerator | 1 | 1 |
| {(Amount of compound I)/(amount of carbon black)} × 100 |  | 5 | — |
| Evaluation | Mooney viscosity index | 94 | 100 |
|  | Scorch time ⊿t5 (minutes) | −2.0 | Reference |
|  | Breaking energy index | 105 | 100 |
|  | Fuel economy index | 120 | 100 |

Table 1 shows the following results.

The fuel economy index was poor in Comparative Example 2 in which carbon black 2 with a high pH and a small volatile content (pH: 10.0, volatile content: 0.3%) was used, compared to Comparative Example 1 in which carbon black 1 (pH: 7.5, volatile content: 1.0%) was used.

In Comparative Example 3 in which N,N-dimethyl-n-octadecylamine was used, the fuel economy index was better than that in Comparative Example 1. However, that improvement was much smaller than those achieved in the examples. In addition, the scorch time was significantly shortened and the processability was deteriorated.

In Comparative Example 4 in which an N-phenylmaleamidic acid sodium salt was used, the fuel economy index was not improved though the processability was not deteriorated.

In contrast, in Examples 1 to 7 in which compound I (a compound represented by the formula (I)) was used, the fuel economy index was greatly improved without causing great deterioration in the Mooney viscosity index, scorch time, and breaking energy index, as compared to Comparative Example 1.

In Comparative Examples 7 and 8 in which carbon black 2 with a high pH and a small volatile content was used, significant improvement in the fuel economy index as shown in the case of using carbon black 1 was not observed.

In Comparative Example 5, though compound I was used, the amount thereof was small. Therefore, the fuel economy index was not so much improved as compared to the examples.

In Comparative Example 6, though compound I was used, the amount thereof was large. This provided a favorable fuel economy index but caused great deterioration in the Mooney viscosity index, scorch time, and breaking energy index.

Table 2 shows that the similar tendencies as shown in Table 1 were found in the case of using a carbon black having a small nitrogen adsorption specific surface area. Specifically, Table 2 shows the following results.

The fuel economy index of Comparative Example 10 in which carbon black 4 with a high pH and a small volatile content (pH: 8.0, volatile content: 0.6%) was used was poor compared to that of Comparative Example 9 in which carbon black 3 (pH: 7.5, volatile content: 1.0%) was used.

In Examples 8 to 10 in which compound I was used, the fuel economy index was greatly improved without causing great deterioration in the Mooney viscosity index, scorch time, and breaking energy index, as compared to Comparative Example 9.

In Comparative Examples 13 and 14 in which carbon black 4 with a high pH and a small volatile content was used, however, significant improvement in the fuel economy index as shown in the case of using carbon black 3 was not observed.

In Comparative Example 11, though compound I was used, the amount thereof was small. Therefore, the fuel economy index was not so much improved as compared to the examples.

In Comparative Example 12, though compound I was used, the amount thereof was large. This provided a favorable fuel economy index but caused great deterioration in the Mooney viscosity index, scorch time, and breaking energy index.

The results in Tables 1 and 2 revealed that when a carbon black having a high pH and a small volatile content was used, the fuel economy was poor and the improvement in fuel economy owing to the use of compound I was not observed. The results also revealed that the improvement in fuel economy owing to compound I was greater as a carbon black having a smaller nitrogen adsorption specific surface area was used.

The results in Tables 3 and 4 revealed that the use of compound I greatly improved the fuel economy even when a blend of NR and BR or of NR and SBR was used.

The results in Tables 1 to 4 revealed that the improvement in fuel economy owing to compound I was increased in proportion to the NR content.

In the following, particularly preferred embodiments of the present invention are more specifically described according to the particular applications, with reference to, but not limited to, examples.

Examples Corresponding to the Rubber Composition of the First Preferred Embodiment Chemicals used in examples and comparative examples shown in Table 5 are listed below.

Natural rubber (NR): TSR20

Isoprene rubber (IR): Nipol IR2200 produced by ZEON CORPORATION

Butadiene rubber (BR): BR730 (cis content: 95 mol %) produced by JSR Corporation Carbon black: DIABLACK A ($N_2SA$: 142 m$^2$/g, DBP oil absorption: 116 cm$^3$/100 g, pH: 7.0, volatile content: 1.2% by mass) produced by Mitsubishi Chemical Corporation Compound I: (2Z)-4-[(4-aminophenyl)amino]-4-oxo-2-butenoic acid sodium salt (compound represented by the following formula) produced by Sumitomo Chemical Co., Ltd.

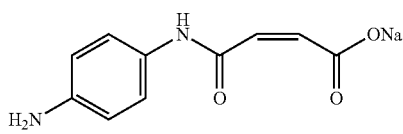

1,4-Diaminobutane: 1,4-diaminobutane produced by KANTO CHEMICAL CO., INC.

Zinc oxide: Zinc oxide #1 produced by MITSUI MINING & SMELTING CO., LTD.

Stearic acid: TSUBAKI produced by NOF CORPORATION

Antioxidant: NOCRAC 6C (N-(1,3-dimethylbutyl)-N'-phenyl-p-phenylenediamine) produced by OUCHI SHINKO CHEMICAL INDUSTRIAL CO., LTD.

Sulfur: powder sulfur produced by TSURUMI CHEMICAL INDUSTRY CO., LTD.

Vulcanization accelerator: NOCCELER-NS (N-tert-butyl-2-benzothiazolylsulfenamide) produced by OUCHI SHINKO CHEMICAL INDUSTRIAL CO., LTD.

Examples and Comparative Examples

In accordance with each of the formulations shown in Table 5, materials except sulfur and a vulcanization accelerator were kneaded using a 1.7-L Banbury mixer produced by KOBE STEEL, LTD. at 150° C. for five minutes to give a kneaded mixture. To the kneaded mixture, the sulfur and vulcanization accelerator were added, and the resulting mixture was kneaded using an open roll mill at 80° C. for five minutes to give an unvulcanized rubber composition. The unvulcanized rubber composition was press-vulcanized in a 2 mm-thick mold at 150° C. for 30 minutes to give a vulcanized rubber composition.

The following evaluation was performed on the thus obtained unvulcanized rubber compositions and vulcanized rubber compositions. Table 5 shows the results.

<Sheet Processability>

Each unvulcanized rubber composition was extruded to give an extrudate sheet. Evaluation was performed on each sheet in terms of the following four points: scorch of the extrudate sheet, flatness of the sheet, maintenance of the extrudate dimensions (the absence of nonuniform shrinkage of the sheet), and straightness (the absence of edge irregularities). The evaluation results of each example are expressed as an index relative to that of Comparative Example 17 (=100). A larger index indicates better sheet processability.

<Breaking Energy>

The tensile strength and elongation at break of a rubber sheet prepared from each vulcanized composition were measured in conformity with JIS K6251 "Rubber, vulcanized or thermoplastic—Determination of tensile stress-strain properties". Then, the breaking energy of each formulation was calculated from: (tensile strength)×(elongation at break)/2, and is expressed as an index calculated from the following formula. A larger index indicates better rubber strength.

(Breaking energy index)=(Breaking energy of each formulation)/(Breaking energy of Comparative Example 17)×100

<Fuel Economy (Rolling Resistance)>

The loss tangent (tan δ) of each vulcanized rubber composition was measured using a viscoelastic spectrometer VES (Iwamoto Seisakusho) at a temperature of 50° C., an initial strain of 10%, a dynamic strain of 2%, and a frequency of 10 Hz, and is expressed as an index calculated from the following formula. A larger index indicates smaller rolling resistance and better fuel economy.

(Fuel economy index)=(tan δ of Comparative Example 17)/(tan δ of each formulation)×100

(Abrasion Resistance)

The volume loss of each vulcanized rubber composition was measured using a LAT tester (Laboratory Abrasion and Skid Tester) at a load of 100 N, a speed of 20 km/h, and a slip angle of 6°, and is expressed as an index calculated from the following formula. A larger index indicates better abrasion resistance.

(Abrasion resistance index)=(Volume loss of Comparative Example 17)/(Volume loss of each formulation)×100

TABLE 5

|  |  | Example | | | | | Comparative Example | |
|---|---|---|---|---|---|---|---|---|
|  |  | 13 | 14 | 15 | 16 | 17 | 17 | 18 |
| Formulation (part(s) by mass) | NR | 80 | 80 | 80 | 80 | 60 | 80 | 80 |
|  | IR | — | — | — | — | 20 | — | — |
|  | BR | 20 | 20 | 20 | 20 | 20 | 20 | 20 |
|  | Carbon black | 50 | 50 | 50 | 50 | 50 | 50 | 50 |
|  | Compound I | 0.25 | 1 | 5 | 7.5 | 1 | — | — |
|  | 1,4-diaminobutane | — | — | — | — | — | — | 1 |
|  | Zinc oxide | 2.5 | 2.5 | 2.5 | 2.5 | 2.5 | 2.5 | 2.5 |
|  | Stearic acid | 2 | 2 | 2 | 2 | 2 | 2 | 2 |
|  | Antioxidant | 1 | 1 | 1 | 1 | 1 | 1 | 1 |
|  | Sulfur | 1.5 | 1.5 | 1.5 | 1.5 | 1.5 | 1.5 | 1.5 |
|  | Vulcanization accelerator | 1 | 1 | 1 | 1 | 1 | 1 | 1 |
| {(Amount of Compound I)/(amount of carbon black)} × 100 |  | 0.5 | 2 | 10 | 15 | 2 | — | — |
| Evaluation | Sheet processability index | 100 | 99 | 98 | 96 | 107 | 100 | 92 |
|  | Breaking energy index | 101 | 102 | 104 | 98 | 98 | 100 | 92 |
|  | Fuel economy index | 106 | 118 | 128 | 132 | 112 | 100 | 108 |
|  | Abrasion resistance index | 100 | 100 | 99 | 98 | 95 | 100 | 93 |

The results in Table 5 revealed that, in Comparative Example 18 in which 1,4-diaminobutane was used, the fuel economy was improved but the sheet processability, breaking energy, and abrasion resistance were greatly deteriorated, as compared to Comparative Example 17.

In contrast, in Examples 13 to 16 in which compound I (compound represented by the formula (I)) was used, the fuel economy was greatly improved while maintaining the sheet processability, breaking energy, and abrasion resistance, as compared to Comparative Example 17.

In Example 17 in which IR was used, the improvement in fuel economy was inferior but the sheet processability was greatly improved, as compared to Example 18.

Examples Corresponding to the Rubber Composition of the Second Preferred Embodiment Chemicals used in examples and comparative examples shown in Tables 6 and 7 are listed below.
Tin-modified BR: BR1250H (polymerized using a lithium initiator, vinyl bond content: 10 to 13 mol %, Mw/Mn: 1.5, tin atom content: 250 ppm, the amount of components having a polystyrene-equivalent molecular weight of at most $10^5$: 2 to 3% by mass) produced by ZEON CORPORATION
Natural rubber (NR): TSR20
Carbon black: DIABLACK I ($N_2SA$: 79 m²/g, DBP oil absorption: 105 cm³/100 g, pH: 7.5, volatile content: 1.0% by mass) produced by Mitsubishi Chemical Corporation
Compound I: (2Z)-4-[(4-aminophenyl)amino]-4-oxo-2-butenoic acid sodium salt (compound represented by the following formula) produced by Sumitomo Chemical Co., Ltd.

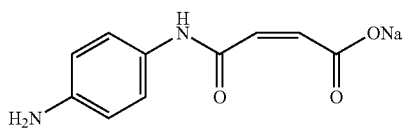

Zinc oxide: Zinc oxide #1 produced by MITSUI MINING & SMELTING CO., LTD.
Stearic acid: TSUBAKI produced by NOF CORPORATION
Aromatic oil: Process X-140 produced by Japan Energy Corporation
Wax: SUNNOC produced by OUCHI SHINKO CHEMICAL INDUSTRIAL CO., LTD.
Antioxidant: NOCRAC 6C (N-(1,3-dimethylbutyl)-N'-phenyl-p-phenylenediamine) produced by OUCHI SHINKO CHEMICAL INDUSTRIAL CO., LTD.
Sulfur: powder sulfur produced by Karuizawa Sulfur
Vulcanization accelerator: NOCCELER-NS (N-tert-butyl-2-benzothiazolylsulfenamide) produced by OUCHI SHINKO CHEMICAL INDUSTRIAL CO., LTD.

Examples and Comparative Examples

In accordance with each of the formulations shown in Tables 6 and 7, chemicals except sulfur and a vulcanization accelerator were kneaded using a Banbury mixer at 150° C. for four minutes to give a kneaded mixture. To the kneaded mixture, the sulfur and vulcanization accelerator were added, and the resulting mixture was kneaded using an open roll mill at 80° C. for three minutes to give an unvulcanized rubber composition. The unvulcanized rubber composition was press-vulcanized at 160° C. for 20 minutes to prepare a vulcanized rubber composition.

The following evaluation was performed on the thus obtained unvulcanized rubber compositions and vulcanized rubber compositions. Tables 6 and 7 show the results. In the following evaluation, the reference comparative examples in Tables 6 and 7 are Comparative Examples 19 and 20, respectively.

<Mooney Viscosity>

The Mooney viscosity of each unvulcanized rubber composition was measured at 130° C. by a method in conformity with JIS K6300, and the measured value is expressed as an index (Mooney viscosity index) calculated from the following formula. A larger index indicates lower Mooney viscosity and better processability.

(Mooney viscosity index)=($ML_{1+4}$ of reference comparative example)/($ML_{1+4}$ of each formulation)×100

<Rubber Strength>

Each vulcanized rubber composition was subjected to a tensile test in conformity with JIS K6251 to measure the elongation at break. The measured value of each formulation is expressed as a rubber strength index calculated from the following formula. A larger index indicates better rubber strength.

(Rubber strength index)=(Elongation at break of each formulation)/(Elongation at break of reference comparative example)×100

<Viscoelasticity Test>

The hysteresis loss (tan δ) and complex modulus of elasticity (E*) of each vulcanized rubber composition were measured at 70° C. using a viscoelastic spectrometer (Iwamoto Seisakusho) at an initial strain of 10%, a dynamic strain amplitude of 1%, and a frequency of 10 Hz, and are expressed as indices calculated from the following formulae. A larger fuel economy index indicates smaller rolling resistance and better fuel economy. A larger rubber rigidity index indicates better handling stability.

(Fuel economy index)=(tan δ of reference comparative example)/(tan δ of each formulation)×100

(Rubber rigidity index)=($E^*$ of each formulation)/($E^*$ of reference comparative example)×100

TABLE 6

| | | Comparative Example | Example | | | |
|---|---|---|---|---|---|---|
| | | 19 | 18 | 19 | 20 | 21 |
| Formulation (part(s) by mass) | Tin-modified BR | 25 | 25 | 25 | 25 | 25 |
| | NR | 75 | 75 | 75 | 75 | 75 |
| | Carbon black | 40 | 40 | 40 | 40 | 40 |
| | Compound I | — | 0.2 | 1 | 5 | 7.5 |
| | Zinc oxide | 3 | 3 | 3 | 3 | 3 |
| | Stearic acid | 2 | 2 | 2 | 2 | 2 |
| | Aromatic oil | 7 | 7 | 7 | 7 | 7 |
| | Wax | 1 | 1 | 1 | 1 | 1 |
| | Antioxidant | 1.5 | 1.5 | 1.5 | 1.5 | 1.5 |
| | Sulfur | 2 | 2 | 2 | 2 | 2 |
| | Vulcanization accelerator | 1.5 | 1.5 | 1.5 | 1.5 | 1.5 |
| {(Amount of Compound I)/(amount of carbon black)} × 100 | | — | 0.5 | 2.5 | 12.5 | 18.75 |
| Evaluation | Mooney viscosity index | 100 | 99 | 98 | 96 | 93 |
| | Rubber strength index | 100 | 100 | 102 | 104 | 98 |
| | Fuel economy index | 100 | 109 | 118 | 125 | 128 |
| | Rubber rigidity index | 100 | 101 | 100 | 103 | 104 |

TABLE 7

| | | Comparative Example 20 | Example 22 |
|---|---|---|---|
| Formulation (part(s) by mass) | Tin-modified BR | 50 | 50 |
| | NR | 50 | 50 |
| | Carbon black | 40 | 40 |
| | Compound I | — | 1 |
| | Zinc oxide | 3 | 3 |
| | Stearic acid | 2 | 2 |
| | Aromatic oil | 7 | 7 |
| | Wax | 1 | 1 |
| | Antioxidant | 1.5 | 1.5 |
| | Sulfur | 2 | 2 |
| | Vulcanization accelerator | 1.5 | 1.5 |
| {(Amount of Compound I)/(amount of carbon black)} × 100 | | — | 2.5 |
| Evaluation | Mooney viscosity index | 100 | 102 |
| | Rubber strength index | 100 | 101 |
| | Fuel economy index | 100 | 110 |
| | Rubber rigidity index | 100 | 101 |

The results in Table 6 revealed that, in Examples 18 to 21 in which compound I (a compound represented by the formula (I)) was used, the fuel economy index was greatly improved while maintaining the Mooney viscosity index and rubber rigidity index, as compared to Comparative Example 19. The rubber strength index was also favorable.

The results in Tables 6 and 7 revealed that the improvement in the fuel economy index owing to compound I was increased in proportion to the NR content.

Examples Corresponding to the Rubber Composition of the Third Preferred Embodiment Chemicals used in examples and comparative examples shown in Tables 8 and 9 are listed below.
NR: RSS #3
SBR: Nipol 1502 produced by ZEON CORPORATION
BR: BR150B produced by UBE INDUSTRIES, LTD.
Modified BR (1): Nipol BR1250H (lithium initiator: lithium, tin atom content: 250 ppm, Mw/Mn: 1.5, vinyl bond content: 10 to 13 mol %) produced by ZEON CORPORATION
Modified BR (2): Terminal-modified BR polymerized using a lithium initiator and having a polymerizing terminal modified with tetraglycidyl-1,3-bisaminomethylcyclohexane (vinyl content: 12% by mass, cis content: 38% by mass, trans content: 50% by mass, Mw/Mn: 1.19, Mw: 550,000)
Carbon black: SHOBLACK N330 ($N_2SA$: 75 $m^2$/g, DBP oil absorption: 102 $cm^3$/100 g, pH: 7.5, volatile content: 1.0% by mass) produced by Cabot Corporation
Silica: VN3 produced by EVONIK DEGUSSA
Compound (I): (2Z)-4-[(4-aminophenyl)amino]-4-oxo-2-butenoic acid sodium salt (compound represented by the following formula) produced by Sumitomo Chemical Co., Ltd.

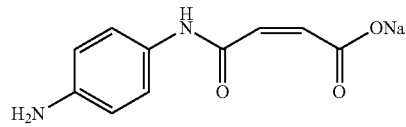

Cross-linkable resin: SUMIKANOL 620 (modified resorcinol resin) produced by Taoka Chemical Co., Ltd.
Methylene donor: SUMIKANOL 507A (containing 65% by mass of a partial condensate of HMMPME and 35% by mass of silica and oil, the above chemical formula with n=1-3, Tables 8 and 9 each show the resin content) produced by Taoka Chemical Co., Ltd.
Insoluble sulfur: SEIMI sulfur (oil content: 10%; the amount of matter insoluble in carbon disulfide: at least 60%; Tables 8 and 9 each show the sum of the oil content and the sulfur content) produced by NIPPON KANRYU INDUSTRY CO., LTD.
Zinc oxide: Ginrei R produced by TOHO ZINC CO., LTD
Antioxidant: NOCRAC 224 (2,2,4-trimethyl-1,2-dihydroquinoline polymer) produced by OUCHI SHINKO CHEMICAL INDUSTRIAL CO., LTD.
Oil: Process PX-140 produced by Japan Energy Corporation
Stearic acid: Stearic acid "TSUBAKI" produced by NOF CORPORATION
Vulcanization accelerator: NOCCELER-NS (N-tert-butyl-2-benzothiazolylsulfenamide) produced by OUCHI SHINKO CHEMICAL INDUSTRIAL CO., LTD.

Examples and Comparative Examples

Preparation of Sample Rubber Sheet

In accordance with each of the formulations shown in Tables 8 and 9, chemicals except sulfur and a vulcanization accelerator were kneaded using a Banbury mixer. To the kneaded mixture, the sulfur and vulcanization accelerator were added, and the resulting mixture was kneaded using an open roll mill to give an unvulcanized rubber composition. The unvulcanized rubber composition was vulcanized at 170° C. for 12 minutes to prepare a sample rubber sheet.

(Preparation of Carcass with Rubber-Topped Fiber Cords)

Fiber cords (polyester (raw material: terephthalic acid and ethylene glycol), produced by TEIJIN LIMITED.) were immersed in a mixed liquid of resorcinol and formaldehyde to form a resorcinol resin film on the fiber cords (dipping treatment). The resulting fiber cords were covered with the unvulcanized rubber composition to form an unvulcanized carcass. The unvulcanized carcass was vulcanized at 180° C. for 40 minutes to give a vulcanized carcass.

The following evaluation was performed on the thus obtained unvulcanized rubber compositions, sample rubber sheets, and vulcanized carcasses. Tables 8 and 9 show the results. In the following evaluation, the reference comparative example was Comparative Example 21 in Table 8, and was Comparative Example 24 in Table 9.

(Roll Processability Index)

In the kneading process using an open roll mill, winding of each unvulcanized rubber composition around a roll, and the like were visually evaluated, and the results are expressed as an index (roll processability index) relative to that of the reference comparative example (~100). A larger index indicates smoother kneading with an open roll mill and better processability.

(Fuel Economy Index)

The loss tangent (tan δ) of each sample rubber sheet was measured using a viscoelastic spectrometer VES (Iwamoto Seisakusho) at a temperature of 70° C., an initial strain of 10%, a dynamic strain of 2%, and a frequency of 10 Hz, and is expressed as an index (fuel economy index) relative to that of the reference comparative example (=100), calculated from the following formula. A larger index indicates smaller rolling resistance and better fuel economy.

(Fuel economy index)=(tan δ of reference comparative example)/(tan δ of each formulation)×100

(Breaking Energy Index)

The tensile strength and elongation at break of each sample rubber sheet were measured in conformity with JIS K6251 "Rubber, vulcanized or thermoplastic—Determination of tensile stress-strain properties". Then, the breaking energy of each formulation was calculated from: (tensile strength)× (elongation at break)/2, and is expressed as a breaking energy index relative to that of the reference comparative example (=100), calculated from the following formula. A larger index indicates better rubber strength.

(Breaking energy index)=(Breaking energy of each formulation)/(Breaking energy of reference comparative example)×100

(Flex Crack Growth Resistance Index)

After each sample rubber sheet was preliminarily subjected to thermo-oxidative degradation at 170° C. for 12 minutes, a flex crack growth resistance test was performed on the sheet in conformity with JIS K6301. In the test, the sample rubber sheet was bent by repeatedly performing 70% elongation 300,000 times. Then, the length of a crack formed was measured.

The inverse of the measurement of each formulation was calculated, and is expressed as an index (flex crack growth resistance index) relative to that of the reference comparative example (=100). A larger index indicates more suppression of crack growth, which means better flex crack growth resistance.

(Adhesion Index)

The tensile stress between rubber and fiber cords of each vulcanized carcass was measured using a tensile tester (INSTRON), and the tensile stress of each formulation is expressed as an index (adhesion index) relative to that of the reference comparative example (=100). A larger index indicates better adhesion to cords.

TABLE 8

|  |  | Example | | | | Comparative Example | | |
| --- | --- | --- | --- | --- | --- | --- | --- | --- |
|  |  | 23 | 24 | 25 | 26 | 21 | 22 | 23 |
| Formulation (part(s) by mass) | NR | 70 | 70 | 70 | 70 | 70 | 70 | 70 |
|  | SBR | 30 | 30 | 30 | 30 | 30 | 30 | 30 |
|  | Carbon black | 45 | 45 | 45 | 45 | 45 | 45 | 45 |
|  | Compound I | 0.25 | 1 | 5 | 8 | — | — | — |
|  | Cross-linkable resin | 1 | 1 | 1 | 1 | 1 | 1 | 1 |
|  | Methylene donor | 1.5 | 1.5 | 1.5 | 1.5 | 1.5 | 1.5 | 1.5 |
|  | Insoluble sulfur (oil content: 10%) | 3.3 | 3.3 | 3.3 | 3.3 | 3.3 | 1.9 | 4 |
|  | Zinc oxide | 6 | 6 | 6 | 6 | 6 | 6 | 6 |
|  | Antioxidant | 1 | 1 | 1 | 1 | 1 | 1 | 1 |
|  | Oil | 9 | 9 | 9 | 9 | 9 | 9 | 9 |
|  | Stearic acid | 2 | 2 | 2 | 2 | 2 | 2 | 2 |
|  | Vulcanization accelerator | 1 | 1 | 1 | 1 | 1 | 1 | 1 |
| (Amount of Compound (I))/(amount of carbon black) × 100 |  | 0.5 | 2.2 | 11 | 18 | — | — | — |
| Evaluation | Roll processability index | 100 | 98 | 92 | 88 | 100 | 100 | 97 |
|  | Fuel economy index | 108 | 115 | 120 | 125 | 100 | 90 | 107 |
|  | Breaking energy index | 100 | 100 | 97 | 94 | 100 | 150 | 75 |
|  | Flex crack growth resistance index | 100 | 102 | 101 | 100 | 100 | 90 | 99 |
|  | Adhesion index | 100 | 100 | 98 | 92 | 100 | 60 | 98 |

TABLE 9

|  |  | Example | | | | | | Comparative Example | | | | | |
| --- | --- | --- | --- | --- | --- | --- | --- | --- | --- | --- | --- | --- | --- |
|  |  | 27 | 28 | 29 | 30 | 31 | 32 | 24 | 25 | 26 | 27 | 28 | 29 |
| Formulation (part(s) by mass) | NR | 60 | 60 | 60 | 60 | 60 | 60 | 60 | 60 | 60 | 60 | 60 | 60 |
|  | SBR | 25 | 25 | 25 | 25 | 25 | 25 | 25 | 25 | 25 | 25 | 25 | 25 |
|  | BR | 15 | 15 | — | — | — | — | 15 | 15 | — | — | — | — |
|  | Modified BR (1) | — | — | 15 | 15 | — | — | — | — | 15 | 15 | — | — |
|  | Modified BR (2) | — | — | — | — | 15 | 15 | — | — | — | — | 15 | 15 |
|  | Carbon black | 45 | 35 | 45 | 35 | 45 | 35 | 45 | 35 | 45 | 35 | 45 | 35 |
|  | Silica | — | 10 | — | 10 | — | 10 | — | 10 | — | 10 | — | 10 |
|  | Compound I | 1 | 1 | 1 | 1 | 1 | 1 | — | — | — | — | — | — |
|  | Cross-linkable resin | 1 | 1 | 1 | 1 | 1 | 1 | 1 | 1 | 1 | 1 | 1 | 1 |
|  | Methylene donor | 1.5 | 1.5 | 1.5 | 1.5 | 1.5 | 1.5 | 1.5 | 1.5 | 1.5 | 1.5 | 1.5 | 1.5 |
|  | Insoluble sulfur (oil content: 10%) | 2.7 | 2.7 | 2.7 | 2.7 | 2.7 | 2.7 | 2.7 | 2.7 | 2.7 | 2.7 | 2.7 | 2.7 |
|  | Zinc oxide | 6 | 6 | 6 | 6 | 6 | 6 | 6 | 6 | 6 | 6 | 6 | 6 |
|  | Antioxidant | 1 | 1 | 1 | 1 | 1 | 1 | 1 | 1 | 1 | 1 | 1 | 1 |
|  | Oil | 9 | 9 | 9 | 9 | 9 | 9 | 9 | 9 | 9 | 9 | 9 | 9 |
|  | Stearic acid | 2 | 2 | 2 | 2 | 2 | 2 | 2 | 2 | 2 | 2 | 2 | 2 |
|  | Vulcanization accelerator | 1 | 1 | 1 | 1 | 1 | 1 | 1 | 1 | 1 | 1 | 1 | 1 |
| (Amount of Compound (I))/(amount of carbon black) × 100 |  | 2.2 | 2.9 | 2.2 | 2.9 | 2.2 | 2.9 | — | — | — | — | — | — |
| Evaluation | Roll processability index | 100 | 95 | 101 | 95 | 95 | 91 | 100 | 97 | 102 | 98 | 94 | 92 |
|  | Fuel economy index | 112 | 116 | 116 | 115 | 111 | 115 | 100 | 105 | 110 | 111 | 102 | 107 |
|  | Breaking energy index | 100 | 147 | 111 | 155 | 102 | 145 | 100 | 145 | 110 | 152 | 100 | 142 |
|  | Flex crack growth resistance index | 100 | 98 | 100 | 98 | 102 | 97 | 100 | 102 | 100 | 101 | 99 | 100 |
|  | Adhesion index | 101 | 101 | 105 | 105 | 103 | 102 | 100 | 100 | 104 | 105 | 102 | 103 |

Table 8 shows the following results.

In Comparative Example 22 in which the amount of sulfur was reduced, the fuel economy and flex crack growth resistance were lowered compared to Comparative Example 21 in which no compound represented by the formula (I) was used. In addition, the adhesion to cords was also greatly lowered.

In Comparative Example 23 in which the amount of sulfur was increased, the fuel economy was improved but the rubber strength was greatly lowered.

In contrast, in the examples in which sulfur and a compound represented by the formula (I) were used in predetermined amounts, the fuel economy was greatly improved while maintaining the processability, rubber strength, flex crack growth resistance, and adhesion to cords at acceptable levels.

Table 9 shows that the similar tendencies as shown in Table 8 were found in the case of using a rubber component containing a blend of NR, SBR, and BR. Specifically, in Examples 27 to 32 in which a compound represented by the formula (I) was used, the fuel economy was greatly improved while maintaining the processability, rubber strength, flex crack growth resistance, and adhesion to cords at acceptable levels, as compared to Comparative Example 24.

In Examples 28, 30, and 32 in which a part of carbon black was replaced with silica, the processability was slightly lowered but both the rubber strength and fuel economy were greatly improved.

The invention claimed is:

1. A pneumatic tire, comprising:
a rubber composition comprising a rubber component, carbon black, and a compound represented by formula (I),

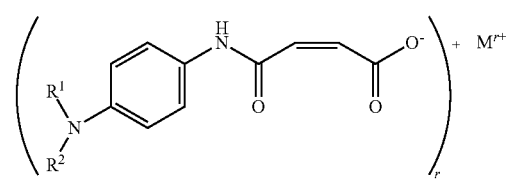

where $R^1$ and $R^2$ are the same or different from each other, and each represent a hydrogen atom, a C1-C20 alkyl group, a C1-C20 alkenyl group, or a C1-C20 alkynyl group, $M^{r+}$ represents a metal ion, and r represents a valence of the metal ion,
wherein an amount of the carbon black is 10 to 100 parts by mass per 100 parts by mass of the rubber component, the rubber component includes a tin-modified butadiene rubber in an amount of 5 to 50% by mass based on 100% by mass of the rubber component, the tin-modified butadiene rubber is prepared by polymerization using a lithium initiator and has a tin-atom content of 50 to 3000 ppm, a vinyl bond content of 5 to 50% by mass, and a molecular weight distribution of at most 2.

2. The pneumatic tire according to claim 1, wherein the compound represented by the formula (I) is represented by formula (I-1), (I-2), or (I-3):

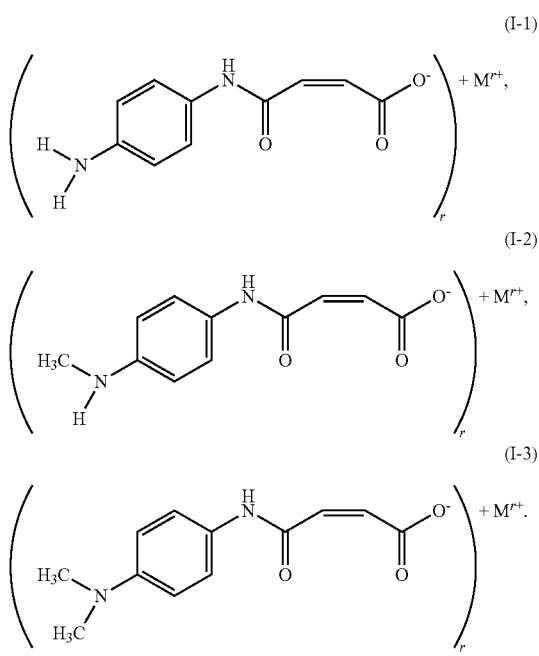

3. The pneumatic tire according to claim 1, wherein the metal ion is a sodium, potassium, or lithium ion.

4. The pneumatic tire according to claim 1, wherein in the rubber composition, an amount of the compound represented by the formula (I) is 0.5 to 20 parts by mass per 100 parts by mass of the carbon black.

5. The pneumatic tire according to claim 1, wherein the carbon black has a pH of at most 7.9 and a volatile content of at least 0.8% by mass.

6. The pneumatic tire according to claim 1, wherein the carbon black has a nitrogen adsorption specific surface area of 20 to 330 m$^2$/g and a dibutyl phthalate oil absorption of 40 to 200 cm$^3$/100 g.

7. The pneumatic tire according to claim 1, wherein in the rubber composition, a combined amount of natural rubber and isoprene rubber is 60 to 80% by mass and an amount of butadiene rubber is 20 to 40% by mass, each based on 100% by mass of the rubber component, the carbon black has a nitrogen adsorption specific surface area of 70 to 200 m$^2$/g and a dibutyl phthalate oil absorption of 75 to 130 cm$^3$/100 g, and the amount of the carbon black is 40 to 60 parts by mass per 100 parts by mass of the rubber component.

8. The pneumatic tire according to claim 1, wherein the amount of the carbon black is 15 to 50 parts by mass per 100 parts by mass of the rubber component.

9. The pneumatic tire according to claim 1, wherein the rubber composition comprises: sulfur; at least one cross-linkable resin selected from the group consisting of a cresol resin, a resorcinol resin, and a modified resorcinol resin; and at least one methylene donor selected from the group consisting of a partial condensate of hexamethoxymethylolmelamine and a partial condensate of hexamethylol melamine pentamethyl ether, the rubber component is a rubber component containing at least one diene rubber selected from the group consisting of isoprene-based rubber, butadiene rubber, and styrene butadiene rubber, the carbon black has a nitrogen adsorption specific surface area of 20 to 130 m$^2$/g, the amount of the carbon black is 10 to 60 parts by mass, an amount of the sulfur is 2 to 3.5 parts by mass, an amount of the cross-linkable resin is 0.5 to 10 parts by mass, and an amount of the methylene donor is 0.1 to 3 parts by mass, each per 100 parts by mass of the rubber component, and an amount of the compound represented by the formula (I) is 0.5 to 20 parts by mass per 100 parts by mass of the carbon black.

10. The pneumatic tire according to claim 2, wherein the metal ion is a sodium, potassium, or lithium ion.

11. The pneumatic tire according to claim 2, wherein in the rubber composition, an amount of the compound represented by the formula (I) is 0.5 to 20 parts by mass per 100 parts by mass of the carbon black.

12. The pneumatic tire according to claim 2, wherein the carbon black has a pH of at most 7.9 and a volatile content of at least 0.8% by mass.

13. The pneumatic tire according to claim 2, wherein the carbon black has a nitrogen adsorption specific surface area of 20 to 330 m$^2$/g and a dibutyl phthalate oil absorption of 40 to 200 cm$^3$/100 g.

14. The pneumatic tire according to claim 2, wherein in the rubber composition, a combined amount of natural rubber and isoprene rubber is 60 to 80% by mass and an amount of butadiene rubber is 20 to 40% by mass, each based on 100% by mass of the rubber component, the carbon black has a nitrogen adsorption specific surface area of 70 to 200 m$^2$/g and a dibutyl phthalate oil absorption of 75 to 130 cm$^3$/100 g, and the amount of the carbon black is 40 to 60 parts by mass per 100 parts by mass of the rubber component.

15. The pneumatic tire according to claim 2, wherein the amount of the carbon black is 15 to 50 parts by mass per 100 parts by mass of the rubber component.

16. The pneumatic tire according to claim 2, wherein the rubber composition comprises: sulfur; at least one cross-linkable resin selected from the group consisting of a cresol resin, a resorcinol resin, and a modified resorcinol resin; and at least one methylene donor selected from the group consisting of a partial condensate of hexamethoxymethylolmelamine and a partial condensate of hexamethylol melamine pentamethyl ether, the rubber component is a rubber component containing at least one diene rubber selected from the group consisting of isoprene-based rubber, butadiene rubber, and styrene butadiene rubber, the carbon black has a nitrogen adsorption specific surface area of 20 to 130 m$^2$/g, the amount of the carbon black is 10 to 60 parts by mass, an amount of the sulfur is 2 to 3.5 parts by mass, an amount of the cross-linkable resin is 0.5 to 10 parts by mass, and an amount of the methylene donor is 0.1 to 3 parts by mass, each per 100 parts by mass of the rubber component, and an amount of the compound represented by the formula (I) is 0.5 to 20 parts by mass per 100 parts by mass of the carbon black.

17. The pneumatic tire according to claim 3, wherein in the rubber composition, an amount of the compound represented by the formula (I) is 0.5 to 20 parts by mass per 100 parts by mass of the carbon black.

18. The pneumatic tire according to claim 3, wherein the carbon black has a pH of at most 7.9 and a volatile content of at least 0.8% by mass.

19. The pneumatic tire according to claim 3, wherein the carbon black has a nitrogen adsorption specific surface area of 20 to 330 m$^2$/g and a dibutyl phthalate oil absorption of 40 to 200 cm$^3$/100 g.

20. The pneumatic tire according to claim 3, wherein in the rubber composition, a combined amount of natural rubber and isoprene rubber is 60 to 80% by mass and an amount of butadiene rubber is 20 to 40% by mass, each based on 100% by mass of the rubber component, the carbon black has a nitrogen adsorption specific surface area of 70 to 200 m$^2$/g and a dibutyl phthalate oil absorption of 75 to 130 cm$^3$/100 g, and the amount of the carbon black is 40 to 60 parts by mass per 100 parts by mass of the rubber component.

* * * * *